US010805032B2

(12) United States Patent
Wang et al.

(10) Patent No.: US 10,805,032 B2
(45) Date of Patent: Oct. 13, 2020

(54) DATA TRANSMISSION METHOD, TERMINAL DEVICE, AND NETWORK SIDE DEVICE

(71) Applicant: HUAWEI TECHNOLOGIES CO., LTD., Shenzhen (CN)

(72) Inventors: Xie Wang, Shenzhen (CN); Yuanda Huang, Dongguan (CN); Liangchuan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/435,548

(22) Filed: Jun. 9, 2019

(65) Prior Publication Data
US 2019/0296848 A1    Sep. 26, 2019

Related U.S. Application Data

(63) Continuation of application No. PCT/CN2016/109290, filed on Dec. 9, 2016.

(51) Int. Cl.
*H04J 14/00* (2006.01)
*H04B 10/2507* (2013.01)
*H04B 10/00* (2013.01)

(52) U.S. Cl.
CPC ............ *H04J 14/005* (2013.01); *H04B 10/00* (2013.01); *H04B 10/2507* (2013.01); *H04J 14/00* (2013.01)

(58) Field of Classification Search
CPC ..... H04B 10/2507; H04B 10/00; H04J 14/00; H04J 14/005
See application file for complete search history.

(56) References Cited

U.S. PATENT DOCUMENTS 7,349,325 B2 * 3/2008 Trzeciak ............... H04B 3/544
370/208
2002/0072380 A1 6/2002 Takashima et al.
(Continued)

FOREIGN PATENT DOCUMENTS

CN         1359199 A     7/2002
CN       101800930 A     8/2010
(Continued)

OTHER PUBLICATIONS

Carrier-sense multiple access with collision detection. Retrieved from https://en.wikipedia.org/wiki/Carrier-sense_multiple_access_with_collision_detection, Jun. 13, 2019, 4 pages.
(Continued)

*Primary Examiner* — Mina M Shalaby
(74) *Attorney, Agent, or Firm* — Kilpatrick Townsend & Stockton LLP

(57) ABSTRACT

Embodiments of this application provide a data transmission method, a terminal device, and a network side device. Encoding, by a terminal device, a first identifier by using a first code word which is selected from at least one code word by the terminal device; sending, by the terminal device, the encoded first identifier to a network side device; receiving, by the terminal device, a second identifier sent by the network side device; decoding, by the terminal device, the second identifier by using the first code word; when the decoded second identifier is the same as the first identifier, encoding, by the terminal device, subsequent data by using the first code word; and sending, by the terminal device, the encoded subsequent data to the network side device.

14 Claims, 10 Drawing Sheets

(56) References Cited

U.S. PATENT DOCUMENTS

| | | | |
|---|---|---|---|
| 2010/0232544 A1 | 9/2010 | Myung et al. | |
| 2012/0091896 A1* | 4/2012 | Schenk | H04B 10/116 315/132 |
| 2012/0149373 A1 | 6/2012 | Tian et al. | |
| 2013/0020947 A1* | 1/2013 | Weaver | H04N 5/2351 315/151 |
| 2013/0051264 A1* | 2/2013 | Wang | H04L 5/0098 370/252 |
| 2014/0226977 A1* | 8/2014 | Jovicic | H04B 10/1149 398/26 |
| 2014/0313520 A1* | 10/2014 | Naethke | G01S 1/70 356/614 |
| 2016/0218804 A1* | 7/2016 | Raj | H04B 10/1149 |
| 2016/0352422 A1* | 12/2016 | Yue | H04B 10/116 |
| 2017/0041072 A1* | 2/2017 | Rong | H04W 76/15 |
| 2017/0195046 A1* | 7/2017 | Cheon | H04L 12/283 |
| 2018/0006723 A1* | 1/2018 | Noh | H04B 10/116 |

FOREIGN PATENT DOCUMENTS

| | | |
|---|---|---|
| CN | 102422614 A | 4/2012 |
| CN | 102439881 A | 5/2012 |
| CN | 103023989 A | 4/2013 |
| CN | 103095394 A | 5/2013 |
| CN | 104243159 A | 12/2014 |
| EP | 2309817 A1 | 4/2011 |
| WO | 2012177190 A1 | 12/2012 |

OTHER PUBLICATIONS

Nuno K. Pratas et al, Random access procedures and radio access network (RAN) overload control in standard and advanced long-term evolution (LTE and LTE-A) networks. Architecture, Performance and Applications, Jan. 23, 2015, 29 pages.

* cited by examiner

DATA TRANSMISSION METHOD, TERMINAL DEVICE, AND NETWORK SIDE DEVICE

CROSS-REFERENCE TO RELATED APPLICATIONS

This application is a continuation of International Application No. PCT/CN2016/109290, filed on Dec. 9, 2016, the disclosure of which is hereby incorporated by reference in its entirety.

TECHNICAL FIELD

Embodiments of this application relate to the communications field, and further relate to a data transmission method, a terminal device, and a network side device.

BACKGROUND

In a high-speed optical network system, an optical multiplexing transmission technology in which optical signals in a plurality of channels are multiplexed and are transmitted by using one optical fiber is essential. Coherent Code Division Multiple Access (CDMA) is an important implementation of a multipoint-to-point system in optical communication. In a coherent CDMA-based network architecture, a self-running process of each service station is a primary step in communication between the service station and an entire network in a communications system. When the service station needs to access the network for communication, the service station initiates a random access process. However, available spreading codes in a same wavelength resource are limited. Therefore, when a plurality of service stations simultaneously access the network, the plurality of service stations may be allocated a same spreading code, and consequently a conflict occurs.

SUMMARY

Embodiments of this application provide a data transmission method, a terminal device, and a network side device, so that the terminal device can normally access a network without a code word conflict, and effectively transmit data to the network side device.

According to a first aspect, an embodiment of this application provides a data transmission method, where the method includes: selecting, by a terminal device, a first code word from at least one code word; encoding, by the terminal device, a first identifier by using the first code word; sending, by the terminal device, the encoded first identifier to a network side device; receiving, by the terminal device, a second identifier sent by the network side device; decoding, by the terminal device, the second identifier by using the first code word; when the decoded second identifier is the same as the first identifier, encoding, by the terminal device, subsequent data by using the first code word; and sending, by the terminal device, the encoded subsequent data to the network side device.

Therefore, in this embodiment of this application, when the first identifier is the same as the second identifier decoded by using the first code word, in other words, when only the terminal device selects the first code word, the terminal device uses the first code word to encode to-be-sent data, so that the terminal device can normally access a network without a code word conflict, and effectively transmit data to the network side device.

In an optional implementation, the method further includes: when the decoded second identifier is the same as the first identifier, obtaining, by the terminal device, dispersion information and/or frequency offset information corresponding to the first code word; and compensating, by the terminal device, for first data by using the dispersion information and/or frequency offset information; and the encoding, by the terminal device, subsequent data by using the first code word includes: encoding, by the terminal device, the compensated first data by using the first code word.

In this case, transmission performance can be further improved by compensating for the to-be-sent data.

In an optional implementation, the encoding, by the terminal device, subsequent data by using the first code word includes: encoding, by the terminal device, first preamble data by using the first code word;

the sending, by the terminal device, the encoded subsequent data to the network side device includes: sending, by the terminal device, the encoded first preamble data to the network side device; and the obtaining, by the terminal device, dispersion information and/or frequency offset information corresponding to the first code word includes: receiving, by the terminal device, the dispersion information and/or frequency offset information that are/is encoded by using the first code word and that are/is sent by the network side device, where the dispersion information and/or frequency offset information are/is determined by the network side device based on the first preamble data; and decoding, by the terminal device, the encoded dispersion information and/or frequency offset information by using the first code word.

In an optional implementation, the method further includes: when the decoded second identifier is the same as the first identifier, obtaining, by the terminal device, synchronization information corresponding to the first code word; and performing, by the terminal device, synchronization based on the synchronization information; and the sending, by the terminal device, the encoded subsequent data to the network side device includes: sending, by the terminal device, encoded second data to the network side device after the synchronization is performed.

In this case, the synchronization is performed before the data is sent, so that the data can be synchronously transmitted.

In an optional implementation, the encoding, by the terminal device, subsequent data by using the first code word includes: encoding, by the terminal device, second preamble data by using the first code word;

the sending, by the terminal device, the encoded subsequent data to the network side device includes: sending, by the terminal device, the encoded second preamble data to the network side device; and the obtaining, by the terminal device, synchronization information corresponding to the first code word includes: receiving, by the terminal device, the synchronization information that is encoded by using the first code word and that is sent by the network side device, where the synchronization information is determined by the network side device based on the second preamble data; and decoding, by the terminal device, the encoded synchronization information by using the first code word.

In an optional implementation, before the selecting, by a terminal device, a first code word from at least one code word, the method further includes: receiving, by the terminal device, indication information that is broadcast by the network side device and that is used to indicate the at least one code word that has not been used for data transmission.

In an optional implementation, the method further includes: when the decoded second identifier is different from the first identifier, starting, by the terminal device, a timer, where duration of the timer is randomly determined duration; and when the timer does not expire, prohibiting the terminal device from selecting a second code word from at least one updated code word that has not been used for data transmission.

In this case, reselection of a code word is prohibited within a random time, so that a possibility that a code word conflict occurs again can be reduced.

According to a second aspect, an embodiment of this application provides a data transmission method, where the method is applied to a Code Division Multiple Access system in optical communications, and the method includes: receiving, by a network side device, a first identifier sent by a terminal device; and broadcasting, by the network side device, the first identifier, so that the terminal device determines whether the first identifier is the same as a second identifier sent by the terminal device.

Therefore, in this embodiment of this application, when the first identifier is the same as the second identifier decoded by using a first code word, in other words, when only the terminal device selects the first code word, the terminal device uses the first code word to encode to-be-sent data, so that the terminal device can normally access a network without a code word conflict, and effectively transmit data to the network side device.

In an optional implementation, the method further includes: receiving, by the network side device, first preamble data that is encoded by using a first code word and that is sent by the terminal device; decoding, by the network side device, the encoded first preamble data by using the first code word; determining, by the network side device based on the decoded first preamble data, dispersion information and/or frequency offset information corresponding to the first code word; encoding, by the network side device, the dispersion information and/or frequency offset information by using the first code word; and sending, by the network side device, the encoded dispersion information and/or frequency offset information to the terminal device, where the dispersion information and/or frequency offset information are/is used by the terminal device to compensate for subsequent data to be sent to the network side device.

In an optional implementation, the method further includes: receiving, by the network side device, second preamble data that is encoded by using the first code word and that is sent by the terminal device; decoding, by the network side device, the second preamble data by using the first code word; determining, by the network side device based on the decoded second preamble data, synchronization information corresponding to the first code word; encoding, by the network side device, the synchronization information by using the first code word; and sending, by the network side device, the encoded synchronization information to the terminal device, where the synchronization information is used by the terminal device to perform synchronization before sending the subsequent data to the network side device.

In an optional implementation, before the receiving, by a network side device, a first identifier sent by a terminal device, the method further includes: broadcasting, by the network side device, first indication information used to indicate at least one code word that has not been used for data transmission.

In an optional implementation, the method further includes: receiving, by the network side device, second indication information sent by the terminal device, where the second indication information is used to indicate that the terminal device has selected the first code word to transmit data; updating, by the network side device, the at least one code word that has not been used for data transmission; and broadcasting, by the network side device, third indication information, where the third indication information is used to indicate at least one updated code word that has not been used for data transmission.

According to a third aspect, an embodiment of this application provides a data transmission method, where the method includes: obtaining, by a terminal device, processing information corresponding to a first code word used by the terminal device, where the processing information includes synchronization information and/or compensation information; encoding, by the terminal device, to-be-sent data by using the first code word; processing, by the terminal device, the encoded data based on the processing information; and sending, by the terminal device, the encoded and processed data to a network side device.

Therefore, in this embodiment of this application, after obtaining the synchronization information and/or the compensation information, the terminal device can implement synchronous transmission by using the synchronization information, and can compensate for the to-be-sent data based on the compensation information, to further improve transmission performance.

In an optional implementation, the obtaining, by a terminal device, processing information corresponding to a first code word used by the terminal device includes: receiving, by the terminal device, the processing information that is encoded by using the first code word and that is sent by the network side device; and decoding, by the terminal device, the encoded processing information by using the first code word.

In an optional implementation, before the obtaining, by a terminal device, synchronization information and/or compensation information corresponding to a first code word used by the terminal device, the method further includes: encoding, by the terminal device, preamble data by using the first code word; and sending, by the terminal device, encoded preamble data to the network side device, where the preamble data is used by the network side device to determine the processing information.

In an optional implementation, before the encoding, by the terminal device, preamble data by using the first code word, the method further includes: selecting, by the terminal device, the first code word from at least one code word; encoding, by the terminal device, a first identifier by using the first code word; sending, by the terminal device, the encoded first identifier to a network side device; receiving, by the terminal device, a second identifier sent by the network side device; decoding, by the terminal device, the second identifier by using the first code word; and determining, by the terminal device, whether the decoded second identifier is the same as the first identifier.

In an optional implementation, before the selecting, by the terminal device, the first code word from at least one code word, the method further includes: receiving, by the terminal device, indication information that is broadcast by the network side device and that is used to indicate the at least one code word that has not been used for data transmission.

In an optional implementation, the compensation information includes dispersion information and/or frequency offset information.

According to a fourth aspect, an embodiment of this application provides a data transmission method, where the method includes: determining, by a network side device, processing information corresponding to a first code word used by a terminal device, where the processing information includes synchronization information and/or compensation information; encoding, by the network side device, the processing information by using the first code word; and sending, by the network side device, the encoded processing information to the terminal device, so that the terminal device performs processing based on the processing information before sending data to the network side device.

Therefore, in this embodiment of this application, after obtaining the synchronization information and/or the compensation information, the terminal device can implement synchronous transmission by using the synchronization information, and can compensate for to-be-sent data based on the compensation information, to further improve transmission performance.

In an optional implementation, before the determining, by a network side device, processing information corresponding to a first code word used by a terminal device, the method further includes: receiving, by the network side device, preamble data that is encoded by using the first code word and that is sent by the terminal device; and decoding, by the network side device, the encoded preamble data by using the first code word; and the determining, by a network side device, processing information corresponding to a first code word used by a terminal device includes: determining, by the network side device, the processing information based on the preamble data.

In an optional implementation, before the receiving, by the network side device, preamble data that is encoded by using the first code word and that is sent by the terminal device, the method further includes: receiving, by the network side device, a first identifier sent by the terminal device; and broadcasting, by the network side device, the first identifier, so that the terminal device determines whether the first identifier is the same as a second identifier sent by the terminal device.

In an optional implementation, before the receiving, by the network side device, a first identifier sent by the terminal device, the method further includes: broadcasting, by the network side device, first indication information used to indicate at least one code word that has not been used for data transmission.

In an optional implementation, the method further includes: receiving, by the network side device, second indication information sent by the terminal device, where the second indication information is used to indicate that the terminal device has selected the first code word to transmit data; updating, by the network side device, the at least one code word that has not been used for data transmission; and broadcasting, by the network side device, third indication information, where the third indication information is used to indicate at least one updated code word that has not been used for data transmission.

In an optional implementation, the compensation information includes dispersion information and/or frequency offset information.

According to a fifth aspect, an embodiment of this application provides a terminal device, configured to perform the method in the first aspect or any possible implementation of the first aspect. Specifically, the terminal device includes modules and units configured to perform the method in the first aspect or any possible implementation of the first aspect.

According to a sixth aspect, an embodiment of this application provides a network side device, configured to perform the method in the second aspect or any possible implementation of the second aspect. Specifically, the network side device includes modules and units configured to perform the method in the second aspect or any possible implementation of the second aspect.

According to a seventh aspect, an embodiment of this application provides a terminal device, configured to perform the method in the third aspect or any possible implementation of the third aspect. Specifically, the terminal device includes modules and units configured to perform the method in the third aspect or any possible implementation of the third aspect.

According to an eighth aspect, an embodiment of this application provides a network side device, configured to perform the method in the fourth aspect or any possible implementation of the fourth aspect. Specifically, the network side device includes modules and units configured to perform the method in the fourth aspect or any possible implementation of the fourth aspect.

According to a ninth aspect, an embodiment of this application provides a terminal device, configured to perform the method in the first aspect or any possible implementation of the first aspect. The terminal device includes a processor, a memory, a receiver, and a transmitter. The processor, the memory, the receiver, and the transmitter are connected through a bus system. The memory is configured to store an instruction, the receiver is configured to receive information, the transmitter is configured to send information, and the processor is configured to execute the instruction stored in the memory.

The processor is configured to select a first code word from at least one code word.

The processor is further configured to encode a first identifier by using the first code word.

The transmitter is configured to send the encoded first identifier to a network side device.

The receiver is configured to receive a second identifier sent by the network side device.

The processor is further configured to decode the second identifier by using the first code word.

The processor is further configured to: when the decoded second identifier is the same as the first identifier, encode subsequent data by using the first code word.

The transmitter is further configured to send the encoded subsequent data to the network side device.

According to a tenth aspect, an embodiment of this application provides a network side device, configured to perform the method in the second aspect or any possible implementation of the second aspect. The network side device includes a processor, a memory, a receiver, and a transmitter. The processor, the memory, the receiver, and the transmitter are connected through a bus system. The memory is configured to store an instruction, the receiver is configured to receive information, the transmitter is configured to send information, and the processor is configured to execute the instruction stored in the memory.

The receiver is configured to receive a first identifier sent by a terminal device.

The transmitter is configured to broadcast the first identifier, so that the terminal device determines whether the first identifier is the same as a second identifier sent by the terminal device.

According to an eleventh aspect, an embodiment of this application provides a terminal device, configured to perform the method in the third aspect or any possible implementation of the third aspect. The terminal device includes a processor, a memory, a receiver, and a transmitter. The processor, the memory, the receiver, and the transmitter are connected through a bus system. The memory is configured to store an instruction, the receiver is configured to receive information, the transmitter is configured to send information, and the processor is configured to execute the instruction stored in the memory.

The processor is configured to obtain processing information corresponding to a first code word used by the terminal device, where the processing information includes synchronization information and/or compensation information.

The processor is further configured to encode to-be-sent data by using the first code word.

The processor is further configured to process the encoded data based on the processing information.

The transmitter is configured to send the encoded and processed data to a network side device.

According to a twelfth aspect, an embodiment of this application provides a network side device, configured to perform the method in the fourth aspect or any possible implementation of the fourth aspect. The network side device includes a processor, a memory, a receiver, and a transmitter. The processor, the memory, the receiver, and the transmitter are connected through a bus system. The memory is configured to store an instruction, the receiver is configured to receive information, the transmitter is configured to send information, and the processor is configured to execute the instruction stored in the memory.

The processor is configured to determine processing information corresponding to a first code word used by a terminal device, where the processing information includes synchronization information and/or compensation information.

The processor is further configured to encode the processing information by using the first code word.

The transmitter is configured to send the encoded processing information to the terminal device, so that the terminal device performs processing based on the processing information before sending data to the network side device.

According to a thirteenth aspect, an embodiment of this application provides a computer-readable medium, configured to store a computer program. The computer program includes an instruction used to perform the method in the first aspect or any possible implementation of the first aspect, in the second aspect or any possible implementation of the second aspect, in the third aspect or any possible implementation of the third aspect, and in the fourth aspect or any possible implementation of the fourth aspect.

DESCRIPTION OF EMBODIMENTS

The following describes the technical solutions in the embodiments of this application with reference to the accompanying drawings in the embodiments of this application.

The embodiments are described with reference to a terminal device and a network side device in this application. The terminal device may also be user equipment, a subscriber unit, a subscriber station, a user terminal, a terminal, a user agent, or a user apparatus. The network side device may also be a base station room or an optical line terminal.

Figure 1:
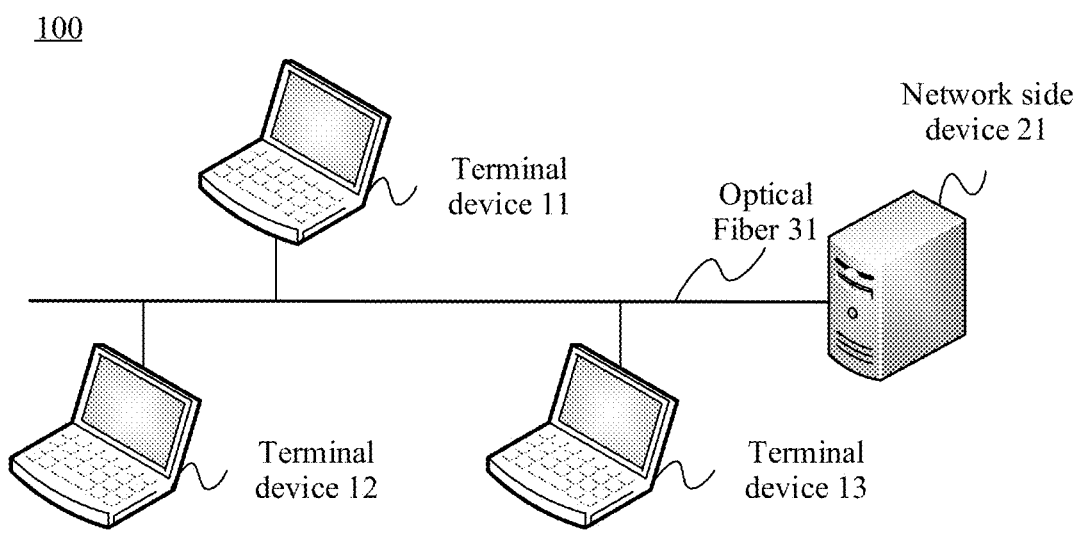
FIG. 1 is a schematic architectural diagram of an application scenario according to an embodiment of this application.

FIG. 1 is a schematic architectural diagram of an application scenario 100 according to an embodiment of this application. As shown in FIG. 1, terminal devices 11 to 13 communicate with a network side device 21 through an optical fiber 31, and a communications network is a coherent CDMA network. When the terminal device 11 and the terminal device 12 simultaneously access the network, the terminal device 11 and the terminal device 12 may be allocated a same spreading code, and consequently neither the terminal device 11 nor the terminal device 12 can normally access the network.

Figure 2:
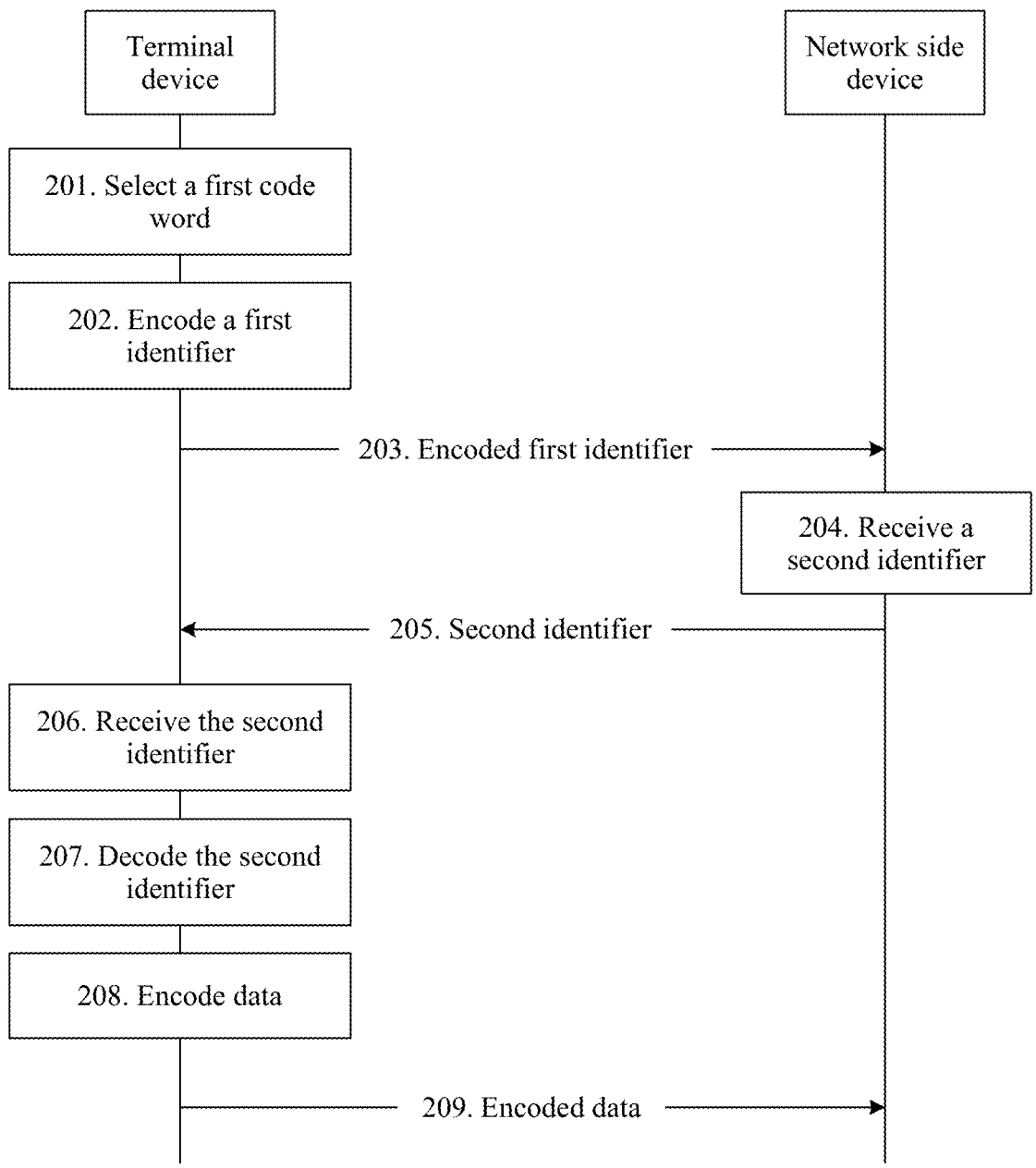
FIG. 2 is a schematic interaction diagram of a data transmission method according to an embodiment of this application.

FIG. 2 is a schematic interaction diagram of a data transmission method 200 according to an embodiment of this application. The method 200 may be applied to the scenario shown in FIG. 1, or certainly may be applied to another optical communications scenario. This is not particularly limited in this embodiment of this application. For example, the network may also be a non-coherent CDMA network.

201. A terminal device selects a first code word from at least one code word.

Optionally, in this embodiment of this application, the terminal device may receive indication information that is broadcast by a network side device and that is used to indicate the at least one code word.

For example, the terminal device may receive a code word set that includes the at least one code word and that is broadcast by the network side device.

Optionally, the at least one code word is a code word in all code words that is not used by another terminal device for data transmission.

For example, both the terminal device and the network side device know that all the code words include a code word 1, a code word 2, and a code word 3. If the network side device determines that code words that currently have not been used for data transmission include the code word 1 and the code word 2, the indication information broadcast by the network side device may be {1, 2}, which is used to indicate to the terminal device that the code word 1 and the code word 2 are available code words; or the indication information broadcast by the network side device may be {1, 1, 0}, where "1" is used to indicate that the code word is available, and "0" is used to indicate that the code word is unavailable.

Optionally, in this embodiment of this application, the terminal device may receive indication information that is used to indicate the at least one code word and that is sent by another terminal device to the terminal device.

Optionally, when the network side device determines that no available code word exists, the network side device may broadcast indication information used to indicate that no available code word exists.

For example, the network side device may broadcast an empty set or "0" to indicate that no available code word exists.

202. The terminal device encodes a first identifier by using the first code word.

Optionally, the first identifier may be randomly generated by the terminal device.

203. The terminal device sends the encoded first identifier to a network side device.

204. The network side device receives a second identifier.

The first identifier is an identifier sent by the terminal device, and the second identifier is the transmitted first identifier received by the network side device.

Specifically, when the terminal device selects the first code word, another terminal device may also select the first code word. In this case, when the terminal device sends, to the network side device, the first identifier encoded by using the first code word, there may also be an identifier that is encoded by the another terminal device by using the first code word, in other words, a code word conflict occurs. In this case, the decoded second identifier is different from the first identifier sent by the terminal device. If only the terminal device selects the first code word, when the terminal device sends, to the network side device, the first identifier encoded by using the first code word, there is no other identifier that is encoded by using the first code word. In this case, the decoded second identifier is the same as the first identifier.

205. The network side device broadcasts the second identifier.

In this case, because the terminal device has not accessed the network side device, the network side device cannot learn of a terminal device that sends the second identifier. Therefore, the network side device needs to broadcast the second identifier.

206. The terminal device receives the second identifier.

207. The terminal device decodes the second identifier by using the first code word.

When another terminal device also selects the first code word, the decoded second identifier is different from the first identifier. If only the terminal device selects the first code word, when the terminal device sends, to the network side device, the first identifier encoded by using the first code word, there is no other identifier that is encoded by using the first code word. In this case, the decoded second identifier is the same as the first identifier.

208. When the decoded second identifier is the same as the first identifier, the terminal device encodes subsequent data by using the first code word.

Therefore, when only the terminal device selects the first code word, the terminal device may use the first code word to transmit the subsequent data.

209. The terminal device sends encoded subsequent data to the network side device.

In an implementation, the terminal device may obtain dispersion information and/or frequency offset information corresponding to the first code word. The terminal device may compensate, by using the dispersion information and/or frequency offset information, for first data to be sent to the network side device. After performing the compensation, the terminal device may encode the compensated first data by using the first code word. The terminal device sends the compensated and encoded first data to the network side device.

In this case, the terminal device can compensate for the to-be-sent data based on the dispersion information and/or frequency offset information, to further improve transmission performance.

Optionally, the terminal device may first encode the to-be-sent first data by using the first code word, and then compensate for the encoded first data by using the dispersion information and/or frequency offset information corresponding to the first code word.

Optionally, when the decoded second identifier is the same as the first identifier, the terminal device may encode, by using the first code word, first preamble data to be sent to the network side device. The terminal device sends the encoded first preamble data to the network side device. The network side device decodes the transmitted encoded first preamble data by using the first code word, to obtain the transmitted first preamble data. The network side device determines, based on the transmitted first preamble data, the dispersion information and/or frequency offset information corresponding to the first code word. The network side device encodes the dispersion information and/or frequency offset information by using the first code word, and sends the encoded dispersion information and/or frequency offset information to the terminal device. The terminal device decodes the encoded dispersion information and/or frequency offset information by using the first code word, to obtain the dispersion information and/or frequency offset information.

Optionally, the network side device knows first preamble data sent by the terminal device. When the encoded first preamble data changes in a transmission process, the network side device may determine, based on the known first preamble data and the transmitted first preamble data, the dispersion information and/or frequency offset information corresponding to the first code word.

Optionally, when receiving the first preamble data, the network side device may decode the first preamble data by using all available code words. A code word with which decoding can succeed is the first code word used when the terminal device encodes the first preamble data.

Optionally, after determining the dispersion information and/or frequency offset information corresponding to the first code word, the network side device may send the dispersion information and/or frequency offset information to another terminal device, and then the another terminal device forwards the dispersion information and/or frequency offset information to the terminal device. Therefore, the terminal device may receive the dispersion information and/or frequency offset information sent by the another terminal device.

Optionally, the network side device may broadcast dispersion information and/or frequency offset information corresponding to each of all code words used for data transmission. After receiving a broadcast message, the terminal device determines, from the broadcast message, the dispersion information and/or frequency offset information corresponding to the first code word.

Optionally, when determining that compensation does not need to be performed, the network side device may send, to the terminal device, a notification message used to notify that the terminal device does not need to perform compensation. After receiving the notification message, the terminal device does not compensate for the first data.

In another implementation, the terminal device may obtain synchronization information corresponding to the first code word. The terminal device may encode first data by using the first code word. The terminal device may perform synchronization before sending the encoded first data to the network side device. The terminal device sends the encoded first data to the network side device after the synchronization is performed.

Optionally, when the decoded second identifier is the same as the first identifier, the terminal device may encode, by using the first code word, second preamble data to be sent to the network side device. The terminal device sends the encoded second preamble data to the network side device. The network side device decodes the transmitted encoded second preamble data by using the first code word, to obtain the transmitted second preamble data. The network side device determines, based on the transmitted second preamble data, the synchronization information corresponding to the first code word. The network side device encodes the synchronization information by using the first code word, and sends the encoded synchronization information to the terminal device. The terminal device decodes the encoded synchronization information by using the first code word, to obtain the synchronization information.

Optionally, the network side device knows second preamble data sent by the terminal device. When the encoded second preamble data changes in a transmission process, the network side device may determine, based on the known second preamble data and the transmitted second preamble data, the dispersion information and/or frequency offset information corresponding to the first code word.

Optionally, after determining the synchronization information corresponding to the first code word, the network side device may send the synchronization information to another terminal device, and then the another terminal device forwards the synchronization information to the terminal device.

Optionally, the network side device may broadcast synchronization information corresponding to each of all code words used for data transmission. After receiving a broadcast message, the terminal device determines, from the broadcast message, the synchronization information corresponding to the first code word.

Optionally, the synchronization information includes a code word length that needs to be offset and that corresponds to the first code word, and the terminal device implements synchronization by offsetting the code word length.

Optionally, when determining that asynchronous communication needs to be performed, the network side device may send, to the terminal device, a notification message used to notify that the network side device performs asynchronous communication. After receiving the notification message, the terminal device directly performs asynchronous communication with the network side device.

In another implementation, the terminal device may first obtain dispersion information and/or frequency offset information corresponding to the first code word, and compensate, by using the dispersion information and/or frequency offset information, for first data to be sent to the network side device. The terminal device then obtains synchronization information corresponding to the first code word. The terminal device may encode the compensated first data by using the first code word. The terminal device may perform synchronization before sending the compensated and encoded first data to the network side device. The terminal device sends the compensated and encoded first data to the network side device after the synchronization is performed.

It should be understood that, in this embodiment of this application, the terminal device obtains the dispersion information and/or frequency offset information by sending the first preamble data, and obtains the synchronization information by sending the second preamble data. However, this embodiment of this application is not limited thereto. The terminal device may send third preamble data to the network side device to obtain at least one of the dispersion information, the frequency offset information, or the synchronization information.

Optionally, in this embodiment of this application, when determining that a code word used by the terminal device is the first code word, the network side device may update the at least one code word that has not been used for data transmission, and broadcast at least one updated code word that has not been used for data transmission.

For example, code words that have not been used for data transmission and that are broadcast by the network side device are a code word 1, a code word 2, and a code word 3. When the network side device determines that the code word used by the terminal device is the code word 2, the network side device updates the code words that have not been used for data transmission to the code word 1 and the code word 3, and broadcasts the updated code words that have not been used for data transmission.

Optionally, when the decoded second identifier is different from the first identifier, the terminal device starts a timer. Duration of the timer is a randomly determined duration. When the timer does not expire, the terminal device is prohibited from selecting a code word from the at least one updated code word that has not been used for data transmission.

For example, the duration of the timer is 1 minute. When receiving, within 1 minute, the at least one updated code word that has not been used for data transmission and that is broadcast by the network side device, the terminal device cannot select a code word from the at least one updated code word.

Therefore, in this embodiment of this application, when the first identifier is the same as the second identifier decoded by using the first code word, in other words, when only the terminal device selects the first code word, the terminal device uses the first code word to encode the to-be-sent data, so that the terminal device can normally access the network without a code word conflict, and effectively transmit data to the network side device.

To facilitate clearer understanding of this application, the data transmission method in the embodiments of this application is described in detail below by using the scenario shown in FIG. 1 as an example and with reference to a method 300 shown in FIG. 3A and FIG. 3B and a method 400 shown in FIG. 4.

Figure 3A:
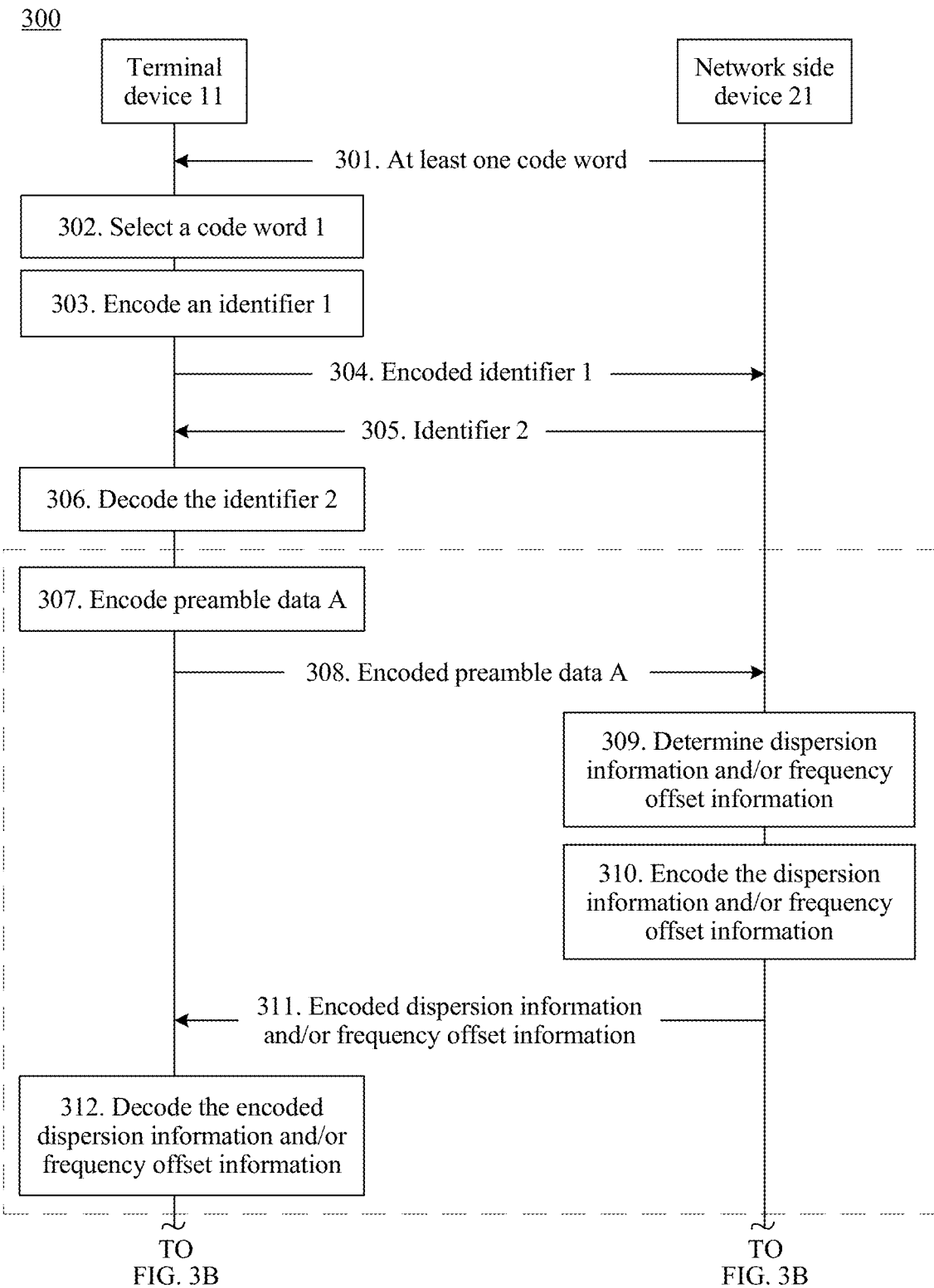
FIG. 3A and FIG. 3B are a schematic interaction diagram of a data transmission method according to an embodiment of this application.
Figure 3B:
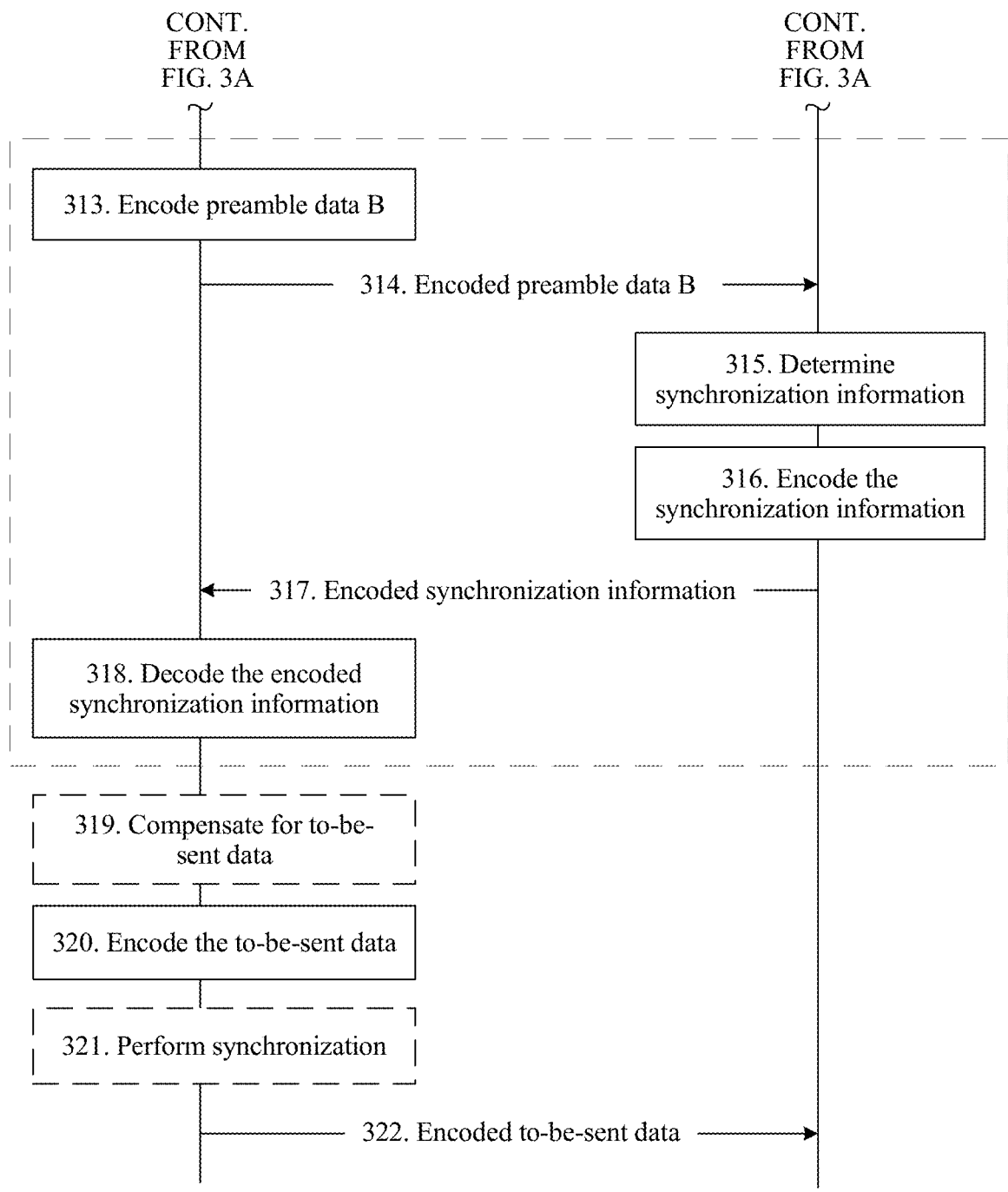

FIG. 3A and FIG. 3B are a schematic interaction diagram of a data transmission method 300 according to an embodiment of this application.

301. A terminal device 11 receives at least one code word that has not been used for data transmission and that is broadcast by a network side device 21.

302. The terminal device 11 selects a code word 1 from the at least one code word.

303. The terminal device 11 encodes a randomly generated identifier 1 by using the code word 1.

304. The terminal device 11 sends the encoded identifier 1 to the network side device 21.

305. After receiving an identifier 2, the network side device 21 broadcasts the identifier 2.

The identifier 1 is an identifier sent by the terminal device 11, and the identifier 2 is the transmitted identifier 1 received by the network side device 21.

Specifically, if another terminal device selects the code word 1, when the terminal device 11 sends, to the network side device 21, the identifier 1 encoded by using the code word 1, there may also be an identifier that is encoded by the another terminal device by using the code word 1, in other words, a code word conflict occurs. In this case, the identifier 2 is different from the identifier 1 sent by the terminal device 11. If no other terminal device selects the code word 1, when the terminal device 11 sends, to the network side device 21, the identifier 1 encoded by using the code word 1, there is no other identifier that is encoded by using the code word 1. In this case, the identifier 2 is the same as the identifier 1.

306. The terminal device 11 decodes the received identifier 2 by using the code word 1.

Specifically, when another terminal device also selects the code word 1, the decoded identifier 2 is different from the identifier 1. If only the terminal device 11 selects the code word 1, when the terminal device 11 sends, to the network side device 21, the identifier 1 encoded by using the code word 1, there is no other identifier that is encoded by using the code word 1. In this case, the identifier 2 is the same as the identifier 1.

Optionally, in step 307, the terminal device 11 encodes preamble data A when the decoded identifier 2 is the same as the identifier 1. In step 308, the terminal device 11 sends the encoded preamble data A to the network side device 21. In step 309, the network side device 21 decodes the transmitted encoded preamble data A by using the code word 1, and determines, based on the transmitted preamble data A, dispersion information and/or frequency offset information corresponding to the code word 1. In step 310, the network side device 21 encodes the dispersion information and/or frequency offset information by using the code word 1. In step 311, the network side device 21 sends the encoded dispersion information and/or frequency offset information to the terminal device 11. In step 312, the terminal device 11 decodes the encoded dispersion information and/or frequency offset information by using the code word 1, to obtain the dispersion information and/or frequency offset information.

Optionally, in step 313, the terminal device 11 encodes preamble data B when the decoded identifier 2 is the same as the identifier 1. In step 314, the terminal device 11 sends the encoded preamble data B to the network side device 21. In step 315, the network side device 21 decodes the transmitted encoded preamble data B by using the code word 1, and determines, based on the transmitted preamble data B, synchronization information corresponding to the code word 1. In step 316, the network side device 21 encodes the synchronization information by using the code word 1. In step 317, the network side device 21 sends the encoded synchronization information to the terminal device 11. In step 318, the terminal device 11 decodes the encoded synchronization information by using the code word 1, to obtain the synchronization information.

Optionally, in step 319, when the terminal device 11 obtains the dispersion information and/or frequency offset information, the terminal device 11 compensates for to-be-sent data based on the dispersion information and/or frequency offset information.

320. The terminal device 11 encodes the to-be-sent data by using the code word 1. Optionally, in step 321, when the terminal device 11 obtains the synchronization information, the terminal device 11 performs synchronization based on the synchronization information.

322. The terminal device 11 sends the encoded to-be-sent data to the network side device 21.

Therefore, in this embodiment of this application, when the first identifier is the same as the second identifier decoded by using the first code word, in other words, when no code word conflict exists, the terminal device may use the first code word to encode the to-be-sent data, so that the terminal device can normally access a network without a code word conflict, and effectively transmit data to the network side device.

In addition, the terminal device can compensate for the to-be-sent data based on the dispersion information and/or frequency offset information, to further improve transmission performance; and may further implement synchronous transmission.

It should be understood that, for an implementation of each step in the method 300 according to this embodiment of this application in FIG. 3A and FIG. 3B, refer to specific descriptions in the method 200 according to the embodiment of this application in FIG. 2. For brevity, details are not described herein again.

It should be further understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application. For example, steps 307 and 313 may be performed before steps 308 to 312 and steps 314 to 318. For another example, steps 313 to 318 may be performed before steps 307 to 312. For another example, step 320 may be performed before step 319.

Figure 4:
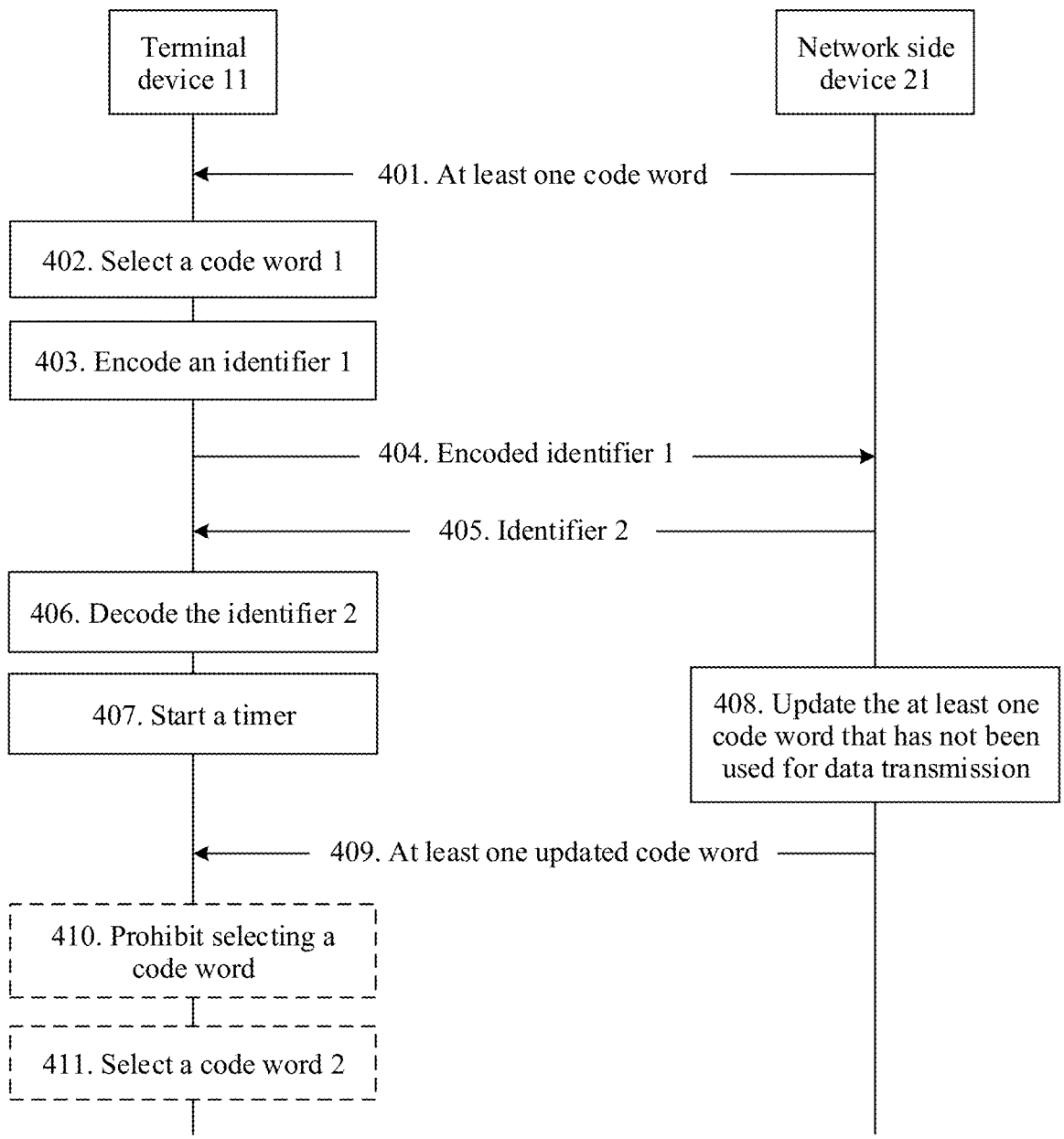
FIG. 4 is a schematic interaction diagram of a data transmission method according to an embodiment of this application.

FIG. 4 is a schematic interaction diagram of a data transmission method 400 according to an embodiment of this application.

Steps 401 to 406 in the method 400 are the same as steps 301 to 306 in the method 300. For brevity, details are not described again.

407. The terminal device 11 starts a timer when the identifier 1 is different from the decoded identifier 2, where duration of the timer is randomly determined by the terminal device 11.

408. The network side device 21 updates the at least one code word that has not been used for data transmission.

409. The network side device 21 broadcasts the at least one updated code word that has not been used for data transmission.

Optionally, in step 410, when the timer does not expire, the terminal device 11 is prohibited from selecting a code word from the at least one updated code word.

Optionally, in step 411, when the timer does not expire, the terminal device 11 may select a code word 2 from the at least one updated code word, and determine whether a code word conflict exists when the code word 2 is used.

Therefore, in this embodiment of this application, when the first identifier is different from the second identifier decoded by using the first code word, in other words, when a code word conflict exists, the terminal device backs off for a random time, and then re-selects a code word, so that a code word conflict that may occur in an access process can be avoided, and accordingly each terminal device subsequently can effectively transmit data to the network side device.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application. For example, steps 407 and 408 may be performed simultaneously.

Figure 5:
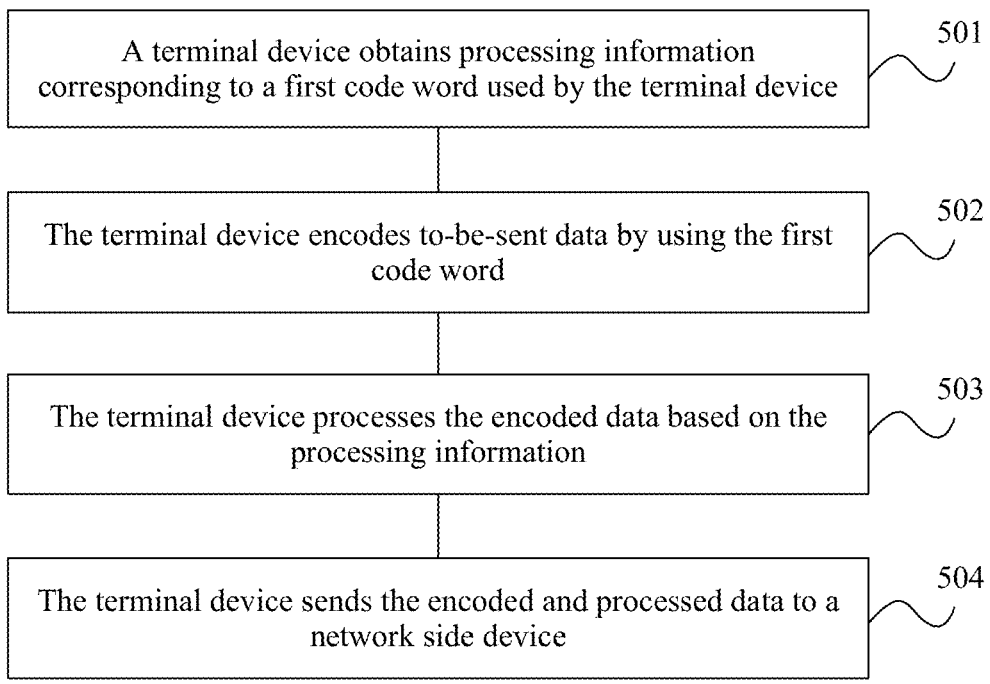
FIG. 5 is a schematic flowchart of a data transmission method according to an embodiment of this application.

FIG. 5 is a schematic flowchart of a data transmission method 500 according to an embodiment of this application.

501. A terminal device obtains processing information corresponding to a first code word used by the terminal device, where the processing information includes synchronization information and/or compensation information.

In an implementation, the terminal device may receive the processing information that is encoded by using the first code word and that is sent by a network side device, and the terminal device decodes the encoded processing information by using the first code word, to obtain the processing information.

Optionally, the terminal device may receive the encoded processing information sent by the network side device in a broadcast manner. Alternatively, the terminal device may receive the encoded processing information sent by the network side device through a dedicated channel.

Optionally, the terminal device may encode preamble data by using the first code word, the terminal device sends the encoded preamble data to the network side device, and the terminal device receives the processing information that is determined based on the preamble data and that is sent by the network side device.

Optionally, before the terminal device sends the encoded preamble data to the network side device, the terminal device may select the first code word from at least one code word. The terminal device sends, to the network side device, a first identifier encoded by using the first code word. The terminal device receives a second identifier sent by the network side device. The terminal device decodes the second identifier by using the first code word. When the decoded second identifier is the same as the first identifier, the terminal device encodes the preamble data by using the first code word.

In another implementation, the terminal device may receive the processing information sent by another terminal device to the terminal device.

For example, the network side device sends the processing information of the terminal device to the another terminal device, and the another terminal device forwards the processing information to the terminal device.

In another implementation, the terminal device may obtain the stored processing information.

502. The terminal device encodes to-be-sent data by using the first code word.

503. The terminal device processes the encoded data based on the processing information.

Optionally, when the processing information is the synchronization information, before sending the encoded data to the network side device, the terminal device may perform synchronization based on the synchronization information.

Optionally, when the processing information is the compensation information, the terminal device needs to compensate for the encoded data.

Optionally, the compensation information may be dispersion information and/or frequency offset information.

Optionally, in this embodiment of this application, the terminal device may first compensate for the to-be-sent data based on the compensation information, then encode the compensated data by using the first code word, and finally send the compensated and encoded data to the network side device after synchronization is performed based on the synchronization information.

504. The terminal device sends the encoded and processed data to a network side device.

Therefore, in this embodiment of this application, after obtaining the synchronization information and/or the compensation information, the terminal device can implement synchronous transmission by using the synchronization information, and can compensate for the to-be-sent data based on the compensation information, to further improve transmission performance.

Figure 6:
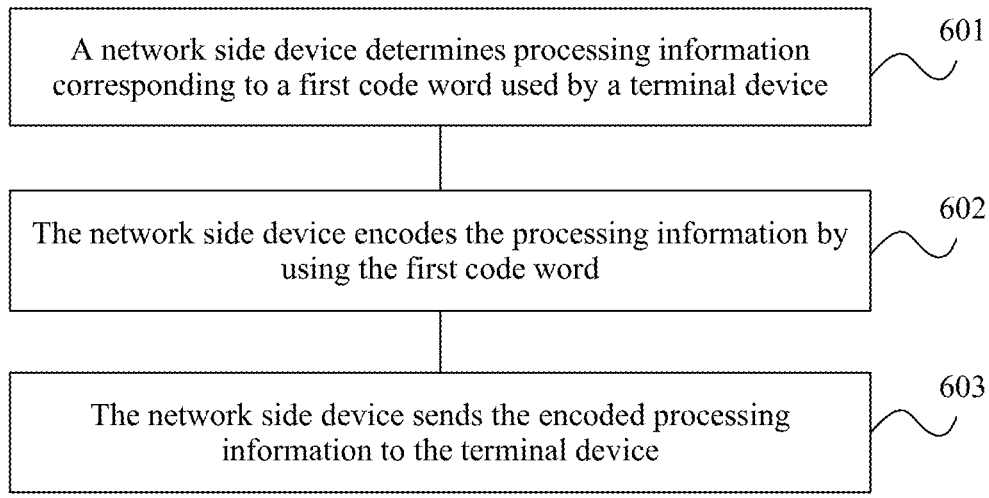
FIG. 6 is a schematic flowchart of a data transmission method according to an embodiment of this application.

FIG. 6 is a schematic flowchart of a data transmission method 600 according to an embodiment of this application.

601. A network side device determines processing information corresponding to a first code word used by a terminal device, where the processing information includes synchronization information and/or compensation information.

In an implementation, the network side device may receive preamble data that is encoded by using the first code word and that is sent by the terminal device, the network side device decodes the encoded preamble data by using the first code word, and the network side device determines the processing information based on the preamble data.

Specifically, the network side device can learn of an original preamble data sent by the terminal device, and the network side device compares the received preamble data with the original preamble data to determine the processing information.

Optionally, before the network side device receives the preamble data that is encoded by using the first code word and that is sent by the terminal device, the network side device receives a first identifier sent by the terminal device, and the network side device broadcasts the first identifier.

In another implementation, the network side device may determine, based on data that uses the first code word and that is sent by the terminal device, that the processing information of the terminal device needs to be updated. The network side device updates the processing information. The network side device encodes updated processing information by using the first code word. The network side device sends the encoded processing information to the terminal device.

602. The network side device encodes the processing information by using the first code word.

603. The network side device sends the encoded processing information to the terminal device, so that the terminal device performs processing based on the processing information before sending data to the network side device.

Therefore, in this embodiment of this application, after obtaining the synchronization information and/or the compensation information, the terminal device can implement synchronous transmission by using the synchronization information, and can compensate for to-be-sent data based on the compensation information, to further improve transmission performance.

The data transmission method according to the embodiments of this application is described above in detail with reference to FIG. 1 to FIG. 6. A terminal device and a network side device according to the embodiments of this application are described below in detail with reference to FIG. 7 to FIG. 14.

Figure 7:
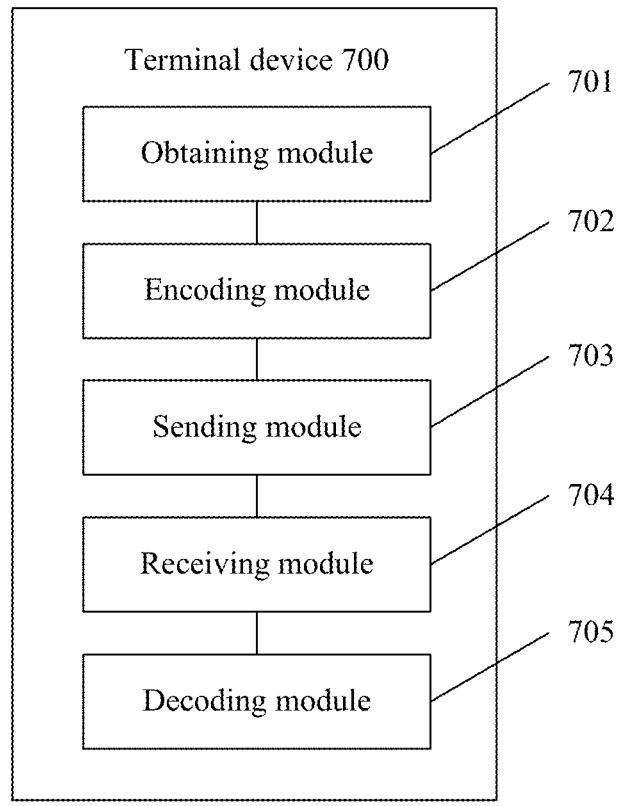
FIG. 7 is a schematic block diagram of a terminal device according to an embodiment of this application.

FIG. 7 is a schematic block diagram of a terminal device 700 according to an embodiment of this application. As shown in FIG. 7, the terminal device 700 includes:

an obtaining module 701, configured to select a first code word from at least one code word;

an encoding module 702, configured to encode a first identifier by using the first code word;

a sending module 703, configured to send the encoded first identifier to a network side device;

a receiving module 704, configured to receive a second identifier sent by the network side device; and a decoding module 705, configured to decode the second identifier by using the first code word.

The encoding module 702 is further configured to: when the decoded second identifier is the same as the first identifier, encode subsequent data by using the first code word.

The sending module 703 is further configured to send the encoded subsequent data to the network side device.

Therefore, in this embodiment of this application, when the first identifier is the same as the second identifier decoded by using the first code word, in other words, only when the terminal device selects the first code word, the terminal device uses the first code word to encode to-be-sent data, so that the terminal device can normally access a network without a code word conflict, and effectively transmit data to the network side device.

Optionally, in this embodiment of this application, the obtaining module 701 is further configured to: when the decoded second identifier is the same as the first identifier, obtain dispersion information and/or frequency offset information corresponding to the first code word. The terminal device 700 further includes a compensation module, configured to compensate for first data by using the dispersion information and/or frequency offset information. The encoding module 702 is further configured to encode the compensated first data by using the first code word.

Optionally, in this embodiment of this application, the encoding module 702 is further configured to encode first preamble data by using the first code word. The sending module 703 is further configured to send the encoded first preamble data to the network side device. The obtaining module 701 further includes: a first receiving unit, configured to receive the dispersion information and/or frequency offset information that are/is encoded by using the first code word and that are/is sent by the network side device, where the dispersion information and/or frequency offset information are/is determined by the network side device based on the first preamble data. The decoding module 705 is further configured to decode the encoded dispersion information and/or frequency offset information by using the first code word.

Optionally, in this embodiment of this application, the obtaining module 701 is further configured to: when the decoded second identifier is the same as the first identifier, obtain synchronization information corresponding to the first code word. The terminal device 700 further includes a synchronization module, configured to perform synchronization based on the synchronization information. The sending module 703 is further configured to send encoded second data to the network side device after the synchronization is performed.

Optionally, in this embodiment of this application, the encoding module 702 is further configured to encode second preamble data by using the first code word. The sending module 703 is further configured to send the encoded second preamble data to the network side device. The obtaining module 701 further includes: a second receiving unit, configured to receive the synchronization information that is encoded by using the first code word and that is sent by the network side device, where the synchronization information is determined by the network side device based on the second preamble data. The decoding module 705 is further configured to decode the encoded synchronization information by using the first code word.

Optionally, in this embodiment of this application, the receiving module 704 is further configured to receive indication information that is broadcast by the network side device and that is used to indicate the at least one code word that has not been used for data transmission.

Optionally, in this embodiment of this application, the terminal device 700 further includes: a timing module, configured to: when the decoded second identifier is different from the first identifier, start a timer, where duration of the timer is randomly determined duration; and a prohibition module, configured to: when the timer does not expire, prohibit selecting a second code word from at least one updated code word that has not been used for data transmission.

It should be understood that, the terminal device 700 according to this embodiment of this application may correspond to the terminal device in the method embodiments of this application, and the foregoing and other operations and/or functions of the modules in the terminal device 700 are intended to implement corresponding procedures of the methods in FIG. 2 to FIG. 4. For brevity, details are not described herein again.

Figure 8:
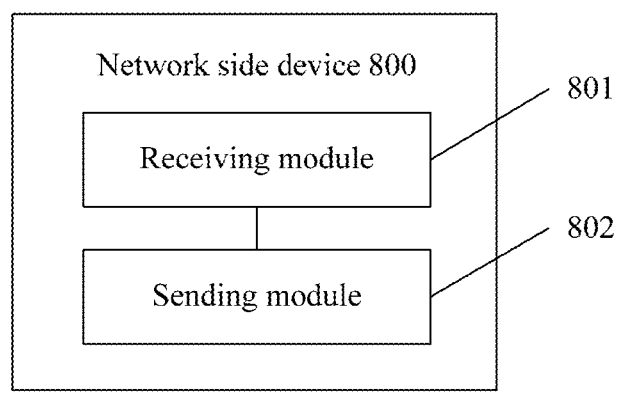
FIG. 8 is a schematic block diagram of a network side device according to an embodiment of this application.

FIG. 8 is a schematic block diagram of a network side device 800 according to an embodiment of this application. As shown in FIG. 8, the network side device 800 includes:

a receiving module 801, configured to receive a first identifier sent by a terminal device; and a sending module 802, configured to broadcast the first identifier, so that the terminal device determines whether the first identifier is the same as a second identifier sent by the terminal device.

Therefore, in this embodiment of this application, when the first identifier is the same as the second identifier decoded by using a first code word, in other words, when only the terminal device selects the first code word, the terminal device uses the first code word to encode to-be-sent data, so that the terminal device can normally access a network without a code word conflict, and effectively transmit data to the network side device.

Optionally, in this embodiment of this application, the receiving module 801 is further configured to receive first preamble data that is encoded by using a first code word and that is sent by the terminal device. The network side device 800 further includes: a first decoding module, configured to decode the encoded first preamble data by using the first code word; a first determining module, configured to determine, based on the decoded first preamble data, dispersion information and/or frequency offset information corresponding to the first code word; and a first encoding module, configured to encode the dispersion information and/or frequency offset information by using the first code word. The sending module 802 is further configured to send the encoded dispersion information and/or frequency offset information to the terminal device, where the dispersion information and/or frequency offset information are/is used by the terminal device to compensate for subsequent data to be sent to the network side device 800.

Optionally, in this embodiment of this application, the receiving module 801 is further configured to receive second preamble data that is encoded by using the first code word and that is sent by the terminal device. The network side device 800 further includes: a second decoding module, configured to decode the second preamble data by using the first code word; a second determining module, configured to determine, based on the decoded second preamble data, synchronization information corresponding to the first code word; and a second encoding module, configured to encode the synchronization information by using the first code word. The sending module 802 is further configured to send the encoded synchronization information to the terminal device, where the synchronization information is used by the terminal device to perform synchronization before sending the subsequent data to the network side device 800.

Optionally, in this embodiment of this application, the sending module 802 is further configured to broadcast first indication information used to indicate at least one code word that has not been used for data transmission.

Optionally, in this embodiment of this application, the receiving module 801 is further configured to receive second indication information sent by the terminal device, where the second indication information is used to indicate that the terminal device has selected the first code word to transmit data. The network side device 800 further includes an update module, configured to update the at least one code word that has not been used for data transmission. The sending module 802 is further configured to broadcast third indication information, where the third indication information is used to indicate at least one updated code word that has not been used for data transmission.

It should be understood that, the network side device 800 according to this embodiment of this application may correspond to the network side device in the embodiments of this application, and the foregoing and other operations and/or functions of the modules in the network side device 800 are intended to implement corresponding procedures of the methods in FIG. 2 to FIG. 4. For brevity, details are not described herein again.

Figure 9:
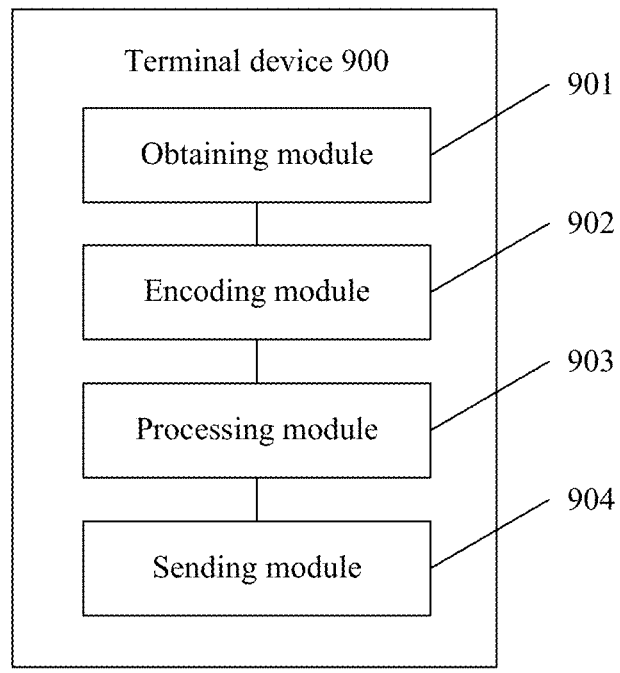
FIG. 9 is a schematic block diagram of a terminal device according to an embodiment of this application.

FIG. 9 is a schematic block diagram of a terminal device 900 according to an embodiment of this application. As shown in FIG. 9, the terminal device 900 includes:

an obtaining module 901, configured to obtain processing information corresponding to a first code word used by the terminal device 900, where the processing information includes synchronization information and/or compensation information;

an encoding module 902, configured to encode to-be-sent data by using the first code word;

a processing module 903, configured to process the encoded data based on the processing information; and a sending module 904, configured to send the encoded and processed data to a network side device.

Therefore, in this embodiment of this application, after obtaining the synchronization information and/or the compensation information, the terminal device 900 can implement synchronous transmission by using the synchronization information, and can compensate for the to-be-sent data based on the compensation information, to further improve transmission performance.

Optionally, in this embodiment of this application, the obtaining module 901 includes: a receiving unit, configured to receive the processing information that is encoded by using the first code word and that is sent by the network side device; and a decoding unit, configured to decode the encoded processing information by using the first code word.

Optionally, in this embodiment of this application, the encoding module 902 is further configured to encode preamble data by using the first code word. The sending module 904 is further configured to send encoded preamble data to the network side device, where the preamble data is used by the network side device to determine the processing information.

Optionally, in this embodiment of this application, the obtaining module is further configured to select the first code word from at least one code word. The encoding module 902 is further configured to encode a first identifier by using the first code word. The sending module 904 is further configured to send the encoded first identifier to the network side device. The terminal device 900 further includes: a receiving module, configured to receive a second identifier sent by the network side device; a decoding module, configured to decode the second identifier by using the first code word; and a determining module, configured to determine that the decoded second identifier is the same as the first identifier.

Optionally, in this embodiment of this application, the obtaining module is further configured to receive indication information that is broadcast by the network side device and that is used to indicate the at least one code word that has not been used for data transmission.

Optionally, in this embodiment of this application, the compensation information includes dispersion information and/or frequency offset information.

It should be understood that, the terminal device 900 according to this embodiment of this application may correspond to the terminal device in the embodiments of this application, and the foregoing and other operations and/or functions of the modules in the terminal device 900 are intended to implement corresponding procedures of the methods in FIG. 5 and FIG. 6. For brevity, details are not described herein again.

Figure 10:
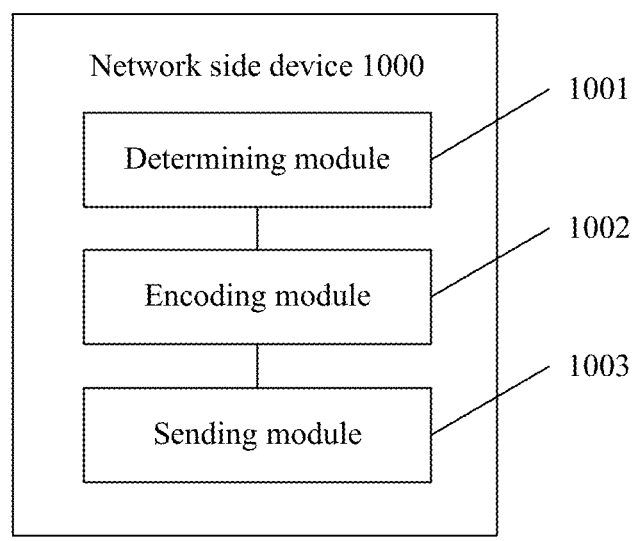
FIG. 10 is a schematic block diagram of a network side device according to an embodiment of this application.

FIG. 10 is a schematic block diagram of a network side device 1000 according to an embodiment of this application. As shown in FIG. 10, the network side device 1000 includes:

a determining module 1001, configured to determine processing information corresponding to a first code word used by a terminal device, where the processing information includes synchronization information and/or compensation information;

an encoding module 1002, configured to encode the processing information by using the first code word; and a sending module 1003, configured to send the encoded processing information to the terminal device, so that the terminal device performs processing based on the processing information before sending data to the network side device 1000.

Therefore, in this embodiment of this application, after obtaining the synchronization information and/or the compensation information, the terminal device can implement synchronous transmission by using the synchronization information, and can compensate for to-be-sent data based on the compensation information, to further improve transmission performance.

Optionally, in this embodiment of this application, the network side device 1000 further includes: a first receiving module, configured to receive preamble data that is encoded by using the first code word and that is sent by the terminal device; and a decoding module, configured to decode the encoded preamble data by using the first code word. The determining module 1001 is specifically configured to determine the processing information based on the preamble data.

Optionally, in this embodiment of this application, the network side device 1000 further includes a second receiving module, configured to receive a first identifier sent by the terminal device. The sending module 1003 is further configured to broadcast the first identifier, so that the terminal device determines whether the first identifier is the same as a second identifier sent by the terminal device.

Optionally, in this embodiment of this application, the sending module is further configured to broadcast first indication information used to indicate at least one code word that has not been used for data transmission.

Optionally, in this embodiment of this application, the network side device 1000 further includes: a third receiving module, configured to receive second indication information sent by the terminal device, where the second indication information is used to indicate that the terminal device has selected the first code word to transmit data; and an update module, configured to update the at least one code word that has not been used for data transmission. The sending module is configured to broadcast third indication information, where the third indication information is used to indicate at least one updated code word that has not been used for data transmission.

Optionally, in this embodiment of this application, the compensation information includes dispersion information and/or frequency offset information.

It should be understood that, the network side device 1000 according to this embodiment of this application may correspond to the network side device in the embodiments of this application, and the foregoing and other operations and/or functions of the modules in the network side device 1000 are intended to implement corresponding procedures of the methods in FIG. 5 and FIG. 6. For brevity, details are not described herein again.

Figure 11:
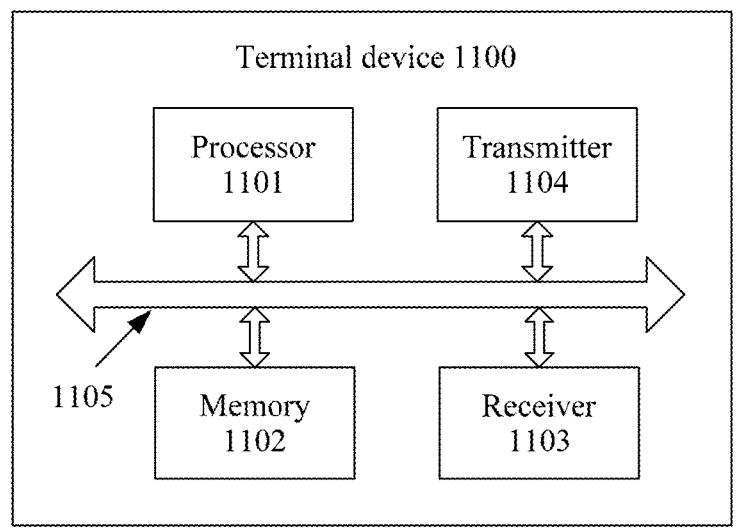
FIG. 11 is a schematic structural diagram of a terminal device according to an embodiment of this application.

FIG. 11 is a schematic structural diagram of a terminal device 1100 according to an embodiment of this application. As shown in FIG. 11, the terminal device 1100 includes a processor 1101, a memory 1102, a receiver 1103, a transmitter 1104, and a bus system 1105. The processor 1101, the memory 1102, the receiver 1103, and the transmitter 1104 are connected through the bus system 1105. The memory 1102 is configured to store an instruction, the receiver 1103 is configured to receive information, the transmitter 1104 is configured to send information, and the processor 1101 is configured to execute the instruction stored in the memory.

The processor 1101 is configured to select a first code word from at least one code word.

The processor 1101 is further configured to encode a first identifier by using the first code word.

The transmitter 1104 is configured to send the encoded first identifier to a network side device.

The receiver 1103 is configured to receive a second identifier sent by the network side device.

The processor 1101 is further configured to decode the second identifier by using the first code word.

The processor 1101 is further configured to: when the decoded second identifier is the same as the first identifier, encode subsequent data by using the first code word.

The transmitter 1104 is further configured to send the encoded subsequent data to the network side device.

It should be understood that, the terminal device 1100 according to this embodiment of this application may correspond to the terminal device in the embodiments of this application, and the foregoing and other operations and/or functions of the modules in the terminal device 1100 are intended to implement corresponding procedures of the methods in FIG. 2 to FIG. 4. For brevity, details are not described herein again.

Figure 12:
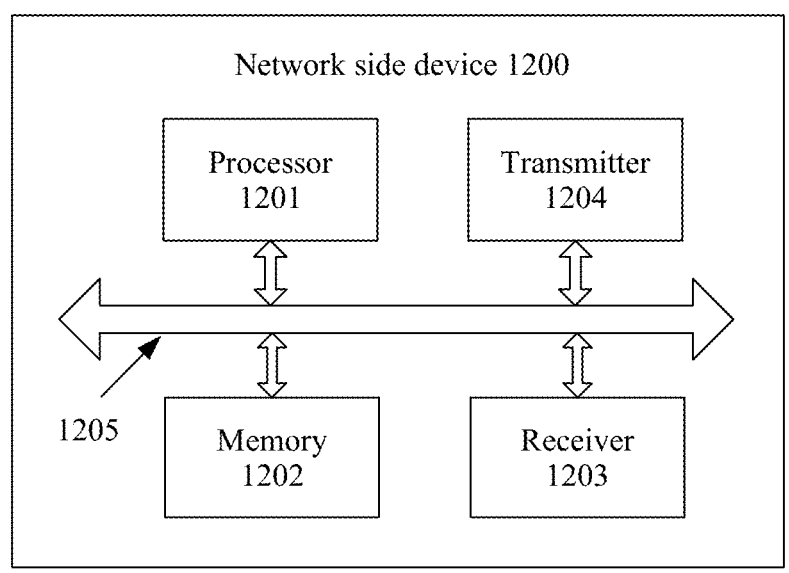
FIG. 12 is a schematic structural diagram of a network side device according to an embodiment of this application.

FIG. 12 is a schematic structural diagram of a network side device 1200 according to an embodiment of this application. As shown in FIG. 12, the network side device 1200 includes a processor 1201, a memory 1202, a receiver 1203, a transmitter 1204, and a bus system 1205. The processor 1201, the memory 1202, the receiver 1203, and the transmitter 1204 are connected through the bus system 1205. The memory 1202 is configured to store an instruction, the receiver 1203 is configured to receive information, the transmitter 1204 is configured to send information, and the processor 1201 is configured to execute the instruction stored in the memory.

The receiver 1203 is configured to receive a first identifier sent by a terminal device.

The transmitter 1204 is configured to broadcast the first identifier, so that the terminal device determines whether the first identifier is the same as a second identifier sent by the terminal device.

It should be understood that, the network side device 1200 according to this embodiment of this application may correspond to the network side device in the embodiments of this application, and the foregoing and other operations and/or functions of the modules in the network side device 1200 are intended to implement corresponding procedures of the methods in FIG. 2 to FIG. 4. For brevity, details are not described herein again.

Figure 13:
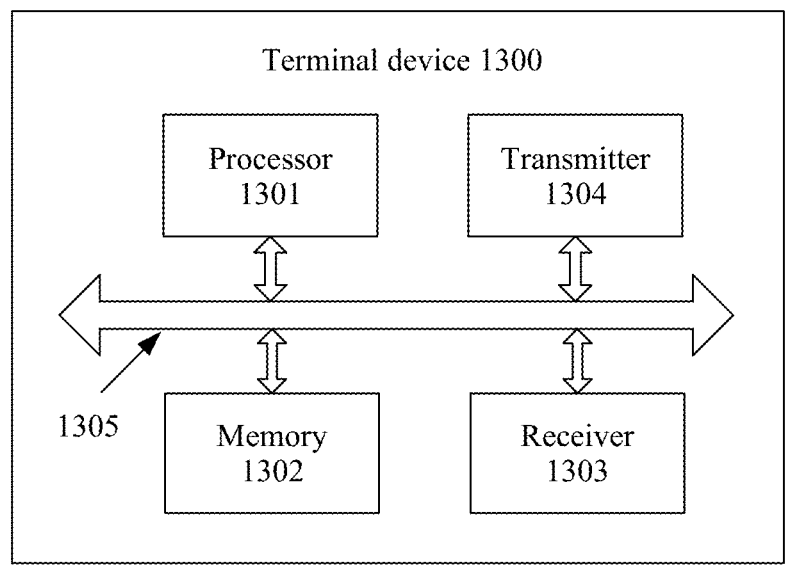
FIG. 13 is a schematic structural diagram of a terminal device according to an embodiment of this application.

FIG. 13 is a schematic structural diagram of a terminal device 1300 according to an embodiment of this application. As shown in FIG. 13, the terminal device 1300 includes a processor 1301, a memory 1302, a receiver 1303, a transmitter 1304, and a bus system 1305. The processor 1301, the memory 1302, the receiver 1303, and the transmitter 1304 are connected through the bus system 1305. The memory 1302 is configured to store an instruction, the receiver 1303 is configured to receive information, the transmitter 1304 is configured to send information, and the processor 1301 is configured to execute the instruction stored in the memory.

The processor 1301 is configured to obtain processing information corresponding to a first code word used by the terminal device 1300, where the processing information includes synchronization information and/or compensation information.

The processor 1301 is further configured to encode to-be-sent data by using the first code word.

The processor 1301 is further configured to process the encoded data based on the processing information.

The transmitter 1304 is configured to send the encoded and processed data to a network side device.

It should be understood that, the terminal device 1300 according to this embodiment of this application may correspond to the terminal device in the embodiments of this application, and the foregoing and other operations and/or functions of the modules in the terminal device 1300 are intended to implement corresponding procedures of the methods in FIG. 5 and FIG. 6. For brevity, details are not described herein again.

Figure 14:
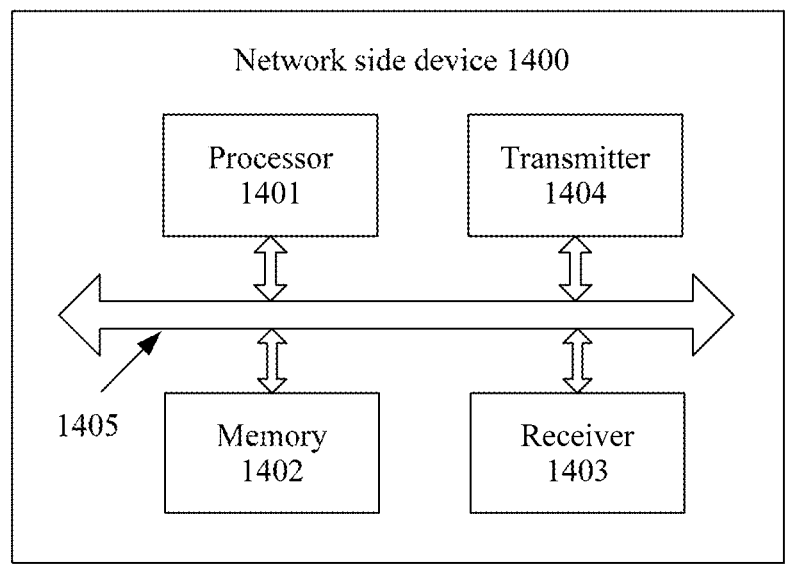
FIG. 14 is a schematic structural diagram of a network side device according to an embodiment of this application.

FIG. 14 is a schematic structural diagram of a network side device 1400 according to an embodiment of this application. As shown in FIG. 14, the network side device 1400 includes a processor 1401, a memory 1402, a receiver 1403, a transmitter 1404, and a bus system 1405. The processor 1401, the memory 1402, the receiver 1403, and the transmitter 1404 are connected through the bus system 1405. The memory 1402 is configured to store an instruction, the receiver 1403 is configured to receive information, the transmitter 1404 is configured to send information, and the processor 1401 is configured to execute the instruction stored in the memory.

The processor 1401 is configured to determine processing information corresponding to a first code word used by a terminal device, where the processing information includes synchronization information and/or compensation information.

The processor 1401 is further configured to encode the processing information by using the first code word.

The transmitter 1404 is configured to send the encoded processing information to the terminal device, so that the terminal device performs processing based on the processing information before sending data to the network side device 1400.

It should be understood that, the network side device 1400 according to this embodiment of this application may correspond to the network side device in the embodiments of this application, and the foregoing and other operations and/or functions of the modules in the network side device 1400 are intended to implement corresponding procedures of the methods in FIG. 5 and FIG. 6. For brevity, details are not described herein again.

In the embodiments of this application, the processor may be a central processing unit (Central Processing Unit, "CPU" for short), a network processor (Network Processor, "NP" for short), or a combination of a CPU and an NP. The processor may further include a hardware chip. The hardware chip may be an application-specific integrated circuit (Application-Specific Integrated Circuit, "ASIC" for short), a programmable logic device (Programmable Logic Device, "PLD" for short), or a combination thereof. The PLD may be a complex programmable logical device (Complex Programmable Logical Device, "CPLD" for short), a field programmable gate array (Field Programmable Gate Array, "FPGA" for short), generic array logic (Generic Array Logic, "GAL" for short), or any combination thereof.

The memory may be a volatile memory or a nonvolatile memory, or may include both the volatile memory and the nonvolatile memory. The nonvolatile memory may be a read-only memory (Read-Only Memory, "ROM" for short), a programmable read-only memory (Programmable ROM, "PROM" for short), an erasable programmable read-only memory (Erasable PROM, "EPROM" for short), an electrically erasable programmable read-only memory (Electrically EPROM, "EEPROM" for short), or a flash memory. The volatile memory may be a random access memory (Random Access Memory, "RAM" for short), and is used as an external cache.

The bus system may further include a power bus, a control bus, a status signal bus, and the like, in addition to a data bus. For ease of representation, only one thick line is used to represent the bus system in the figure, but it does not mean that there is only one bus or only one type of bus.

An embodiment of this application provides a computer-readable medium, configured to store a computer program. The computer program includes an instruction used to perform the data transmission method in the foregoing embodiments of this application in FIG. 2 to FIG. 4. The readable medium may be a ROM or a RAM, and this is not limited in this embodiment of this application.

It should be understood that the terms "and/or" and "at least one of A or B" in this specification describe only an association relationship for describing associated objects and represent that three relationships may exist. For example, A and/or B may represent the following three cases: Only A exists, both A and B exist, and only B exists. In addition, the character "/" in this specification generally represents an "or" relationship between the associated objects.

A person of ordinary skill in the art may be aware that, units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium described above includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   encoding, by a terminal device, a first identifier by using a first code word which is selected by the terminal device from at least one code word;
   sending, by the terminal device, the encoded first identifier to a network side device;
   receiving, by the terminal device, a second identifier sent by the network side device;
   decoding, by the terminal device, the second identifier by using the first code word;
   encoding, by the terminal device, subsequent data by using the first code word when the decoded second identifier is the same as the first identifier; and
   sending, by the terminal device, the encoded subsequent data to the network side device.

2. The method according to claim 1, wherein the method further comprises:
   obtaining, by the terminal device, dispersion information and/or frequency offset information corresponding to the first code word when the decoded second identifier is the same as the first identifier; and
   compensating, by the terminal device, for first data by using the dispersion information and/or frequency offset information; and
   wherein the encoding, by the terminal device, subsequent data by using the first code word comprises:
   encoding, by the terminal device, the compensated first data by using the first code word.

3. The method according to claim 2, wherein the encoding, by the terminal device, subsequent data by using the first code word comprises:
   encoding, by the terminal device, first preamble data by using the first code word;
   wherein the sending, by the terminal device, the encoded subsequent data to the network side device comprises:
   sending, by the terminal device, the encoded first preamble data to the network side device; and
   the obtaining, by the terminal device, dispersion information and/or frequency offset information corresponding to the first code word comprises:
   receiving, by the terminal device, the dispersion information and/or frequency offset information that are/is encoded by using the first code word and that are/is sent by the network side device, wherein the dispersion information and/or frequency offset information are/is determined by the network side device based on the first preamble data; and
   decoding, by the terminal device, the encoded dispersion information and/or frequency offset information by using the first code word.

4. The method according to claim 1, wherein the method further comprises:
   obtaining, by the terminal device, synchronization information corresponding to the first code word when the decoded second identifier is the same as the first identifier; and
   performing, by the terminal device, synchronization based on the synchronization information; and
   wherein the sending, by the terminal device, the encoded subsequent data to the network side device comprises:
   sending, by the terminal device, encoded second data to the network side device after the synchronization is performed.

5. The method according to claim 4, wherein the encoding, by the terminal device, subsequent data by using the first code word comprises:
   encoding, by the terminal device, second preamble data by using the first code word;
   wherein the sending, by the terminal device, the encoded subsequent data to the network side device comprises:
   sending, by the terminal device, the encoded second preamble data to the network side device; and
   the obtaining, by the terminal device, synchronization information corresponding to the first code word comprises:
   receiving, by the terminal device, the synchronization information that is encoded by using the first code word and that is sent by the network side device, wherein the synchronization information is determined by the network side device based on the second preamble data; and
   decoding, by the terminal device, the encoded synchronization information by using the first code word.

6. The method according to claim 1, wherein before the encoding, by a terminal device, a first identifier by using a first code word which is selected by the terminal device from at least one code word, the method further comprises:
   receiving, by the terminal device, indication information that is broadcast by the network side device and that is used to indicate the at least one code word that has not been used for data transmission.

7. The method according to claim 1, wherein the method further comprises:
   starting, by the terminal device, a timer when the decoded second identifier is different from the first identifier, wherein duration of the timer is randomly determined duration; and
   prohibiting the terminal device from selecting a second code word from at least one updated code word that has not been used for data transmission when the timer does not expire.

8. A terminal device, comprising: memory comprising instructions, and at least one receiver, and at least one transmitter and at least one processor in communication the memory:
   the processor configured to encode a first identifier by using a first code word which is selected from at least one code word;
   the transmitter, configured to send the encoded first identifier to a network side device;
   the receiver, configured to receive a second identifier sent by the network side device; and
   the processor is further configured to decode the second identifier by using the first code word, wherein the processor is further configured to: when the decoded second identifier is the same as the first identifier, encode subsequent data by using the first code word; and the transmitter is further configured to send the encoded subsequent data to the network side device.

9. The terminal device according to claim 8, wherein the processor is further configured to: when the decoded second identifier is the same as the first identifier, obtain dispersion information and/or frequency offset information corresponding to the first code word; and the processor is configured to compensate for first data by using the dispersion information and/or frequency offset information; and the processor is further configured to encode the compensated first data by using the first code word.

10. The terminal device according to claim 9, wherein the processor is further configured to encode first preamble data by using the first code word;

the transmitter is further configured to send the encoded first preamble data to the network side device;

the receiver is configured to receive the dispersion information and/or frequency offset information that are/is encoded by using the first code word and that are/is sent by the network side device, wherein the dispersion information and/or frequency offset information are/is determined by the network side device based on the first preamble data; and the processor is further configured to decode the encoded dispersion information and/or frequency offset information by using the first code word.

11. The terminal device according to claim 8, wherein the processor is further configured to: when the decoded second identifier is the same as the first identifier, obtain synchronization information corresponding to the first code word; and the processor is further configured to perform synchronization based on the synchronization information; and the transmitter is further configured to send encoded second data to the network side device after the synchronization is performed.

12. The terminal device according to claim 11, wherein the processor is further configured to encode second preamble data by using the first code word;

the transmitter is further configured to send the encoded second preamble data to the network side device; and the receiver is further configured to receive the synchronization information that is encoded by using the first code word and that is sent by the network side device, wherein the synchronization information is determined by the network side device based on the second preamble data; and the processor is further configured to decode the encoded synchronization information by using the first code word.

13. The terminal device according to claim 8, wherein the receiver is further configured to receive indication information that is broadcast by the network side device and that is used to indicate the at least one code word that has not been used for data transmission.

14. The terminal device according to claim 8, wherein the processor is further configured to start a timer when the decoded second identifier is different from the first identifier, wherein duration of the timer is randomly determined duration; and the processor is further configured to prohibit selecting a second code word from at least one updated code word that has not been used for data transmission when the timer does not expire.

* * * * *